(12) United States Patent
Sharaga et al.

(10) Patent No.: US 8,396,014 B2
(45) Date of Patent: Mar. 12, 2013

(54) TECHNIQUES FOR MANAGEMENT OF SHARED RESOURCES IN WIRELESS MULTI-COMMUNICATION DEVICES

(75) Inventors: Avishay Sharaga, Beit Nehemya (IL); Avital Shlomo, Jerusalem (IL); Moshe Noah, Yokneam (IL); Jubran Ghanadry, Galil Ilion (IL)

(73) Assignee: Intel Corporation, Santa Clara, CA (US)

( * ) Notice: Subject to any disclaimer, the term of this patent is extended or adjusted under 35 U.S.C. 154(b) by 846 days.

(21) Appl. No.: 12/215,325

(22) Filed: Jun. 25, 2008

(65) Prior Publication Data

US 2009/0323651 A1 Dec. 31, 2009

(51) Int. Cl.
*H04B 7/00* (2006.01)
(52) U.S. Cl. ...................................... 370/310
(58) Field of Classification Search ............... 370/310, 370/339, 345–350, 431–437, 462; 455/502
See application file for complete search history.

(56) References Cited

U.S. PATENT DOCUMENTS

| | | | |
|---|---|---|---|
| 7,054,290 B1* | 5/2006 | Djuphammar | 370/331 |
| 7,079,811 B2* | 7/2006 | Lee et al. | 455/41.2 |
| 7,099,671 B2* | 8/2006 | Liang | 455/450 |
| 7,117,008 B2* | 10/2006 | Bajikar | 455/552.1 |
| 2003/0083095 A1 | 5/2003 | Liang | |
| 2004/0048577 A1* | 3/2004 | Godfrey et al. | 455/67.11 |
| 2005/0014468 A1* | 1/2005 | Salokannel et al. | 455/41.2 |
| 2005/0152322 A1* | 7/2005 | Dolwin et al. | 370/338 |
| 2007/0099640 A1* | 5/2007 | Khushu et al. | 455/502 |
| 2007/0135162 A1* | 6/2007 | Banerjea et al. | 455/556.1 |
| 2007/0142084 A1* | 6/2007 | Van Niekerk et al. | 455/557 |
| 2009/0180451 A1* | 7/2009 | Alpert et al. | 370/338 |
| 2009/0323570 A1* | 12/2009 | Ginzburg et al. | 370/311 |
| 2009/0327767 A1* | 12/2009 | Ginzburg et al. | 713/300 |

FOREIGN PATENT DOCUMENTS

| | | |
|---|---|---|
| JP | 11249997 A | 9/1999 |
| JP | 2007-325260 A | 12/2007 |
| JP | 2008541571 A | 11/2008 |
| JP | 2009518963 A | 5/2009 |
| WO | 2006119471 A2 | 11/2006 |
| WO | 2007070409 A1 | 6/2007 |

OTHER PUBLICATIONS

International Search Report in related application No. PCT/US2009/047330 mailed Jan. 27, 2010, 7 pages.
Chinese Office Action with English translation corresponding to Chinese Application No. 200910139834.X, dated Oct. 17, 2011, 7 pages.
Taiwanese Office Action corresponding to Taiwanese Patent Application No. 98120464, 7 pages, Jul. 31, 2012.

(Continued)

*Primary Examiner* — Dmitry H Levitan
(74) *Attorney, Agent, or Firm* — Pillsbury Winthrop Shaw & Pittman LLP

(57) ABSTRACT

An embodiment of the present invention provides an apparatus, comprising a network adapter configured for wireless communication using more than one technology, wherein the network adapter is configured to share a plurality of shared hardware (HW) components by generating a notification when a shared HW resource becomes available to a requesting device that needs the HW resource, and registering the requesting device so that it will receive the notifications when generated; and wherein upon receiving the notifications, the requesting device will wake up and perform a pending action.

23 Claims, 2 Drawing Sheets

OTHER PUBLICATIONS

Japanese Office Action with English Translation corresponding to Japanese Patent Application No. 2011-502147, dated Jun. 26, 2012, 6 pages.

English Translation of Korean Office Action issued in KR Application No. 2010-7021353, dated May 15, 2012, 5 pages.

* cited by examiner

TECHNIQUES FOR MANAGEMENT OF SHARED RESOURCES IN WIRELESS MULTI-COMMUNICATION DEVICES

BACKGROUND

As wireless communication technology evolves and improves, different wireless communication technologies must coexist in a given platform. As different wireless communication technologies may have benefits and superior performance in a particular usage scenario, it is advantageous to enable multiple wireless communication technologies to be used for a particular device. Further, different wireless comms (also referred to herein as wireless communications) might share some of the hardware components on the device (such radio, antennas etc). Sharing hardware components might limit the usage of the device in a way that at a given time only one of the wireless comms can use the hardware to transmit or receive.

Thus, it would be advantageous to improve the ability for wireless devices and apparatus to share hardware components when multiple communication technologies coexist.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
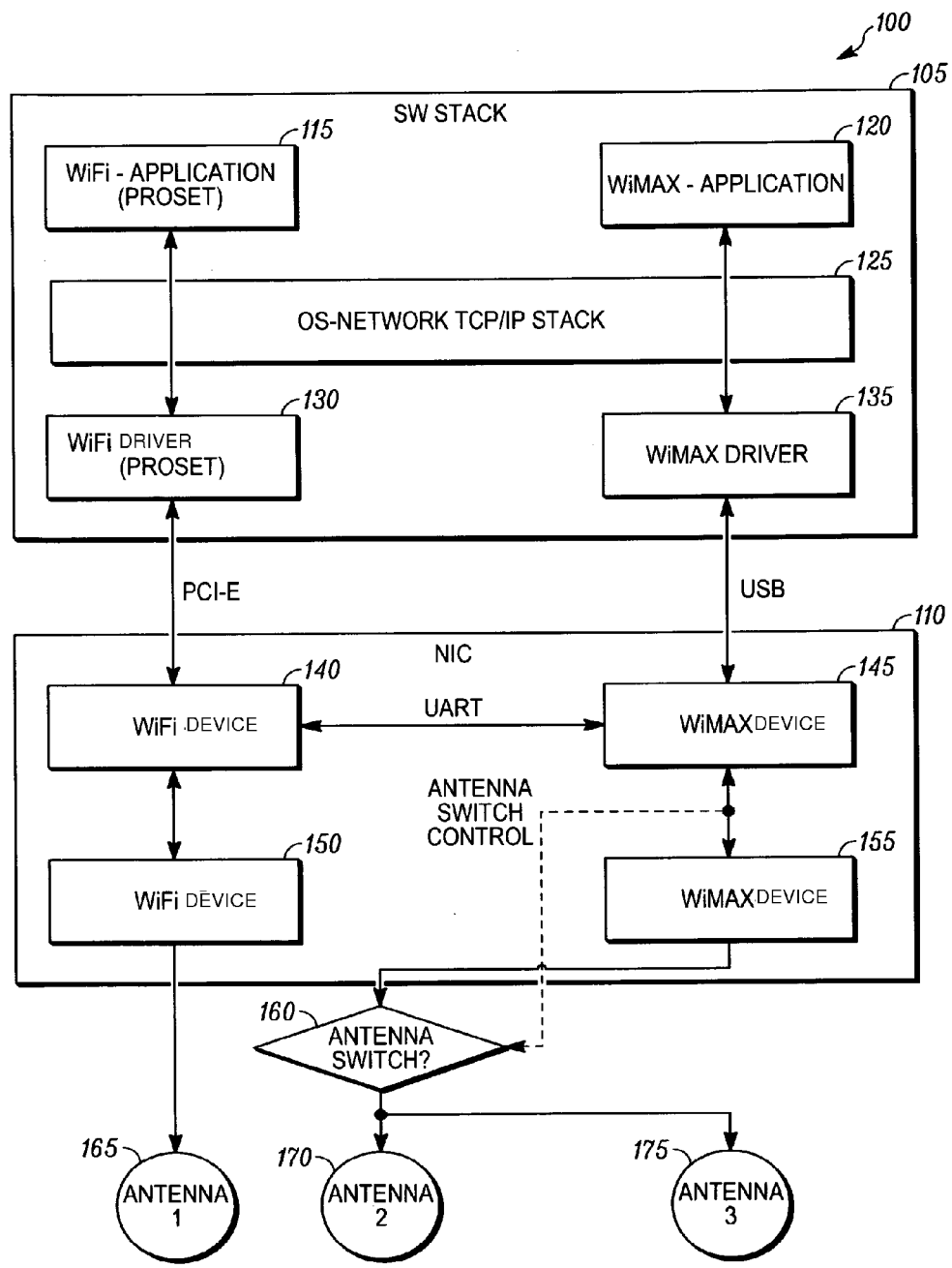
FIG. 1 illustrates an example of a WiFi-WiMAX combo device with distributed management utility of an embodiment of the present invention.

It will be appreciated that for simplicity and clarity of illustration, elements illustrated in the figures have not necessarily been drawn to scale. For example, the dimensions of some of the elements are exaggerated relative to other elements for clarity. Further, where considered appropriate, reference numerals have been repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Embodiments of the invention may be used in a variety of applications. Some embodiments of the invention may be used in conjunction with various devices and systems, for example, a transmitter, a receiver, a transceiver, a transmitter-receiver, a wireless communication station, a wireless communication device, a wireless Access Point (AP), a modem, a wireless modem, a Personal Computer (PC), a desktop computer, a mobile computer, a laptop computer, a notebook computer, a tablet computer, a server computer, a handheld computer, a handheld device, a Personal Digital Assistant (PDA) device or a handheld PDA device. Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. For example, "a plurality of stations" may include two or more stations.

A wireless multicomm device as described herein may be a network adapter that combines more then one wireless technology (each wireless technology may be referred as a "comm"). The different wireless comms might share some of the hardware components on the device (such radio, antennas etc)—it is understood that this list is not exhaustive of the hardware components that may be shared. Sharing hardware components might limit the usage of the device in a way that at a given time only one of the wireless comms can use the hardware to transmit or receive.

As used herein, in an embodiment of the present invention, the term "multicomm device" also may provide a wireless-multicomm device with shared hardware (HW) that limits the access to the air to one comm only at a given time.

Looking now at FIG. 1, shown generally as 100, is an example ot Wifi-WiMAX combo device with a distributed management utility. Software (SW) tack 105 may be interfaced with network interface controller (NIC) 110 via any host interface (e.g. Universal Serial Bus (USB), Peripheral Component Interconnect Express (PCI-E), or Secure Digital Input Output (SDIO) bus). The NIC may be in communication with antenna switch 160, antenna 1 165, antenna 2 170 and antenna 3 175.

SW stack 105 may include WiFi application 115 in communication with WiFi driver 130 and WiMAX application 120 in communication with WiMAX driver 135 via OS-network TCP/IP stack 125. A NIC of an embodiment of the present invention may include WiFi Device 140 in communication with WiFi driver 130 via PCI-E and further in communication with WiFi Device 150 on said NIC. WiFi Device 140 may further be in communication with WiMax Device 145 via UART (it is understood that the present invention is not limited in this respect) which may be in communication with WIMAX driver 135 via USB. WiMAX Device 145 on NIC 110 may also be in communication with WiMAX Device 155 with antenna control existing therebetween, which may be in direct communication with antenna switch 160—again, it is understood that the present invention is not limited to this architecture.

In embodiments of the present invention, the communication device may perform some background activities while not connected, for example scanning for available network or Radio calibration. These actions may be triggered by an external source (for example user scan request) or by internal source like timer based periodic scanning. Performing these actions when a radio is shared between multiple devices is not trivial, and it requires some protocol for radio ownership management.

Wireless combo devices that share HW resources are designed with a coexistence scheme that allows each wireless device to have partial access to the HW resources based on the current state of each device and in order to satisfy the relevant use case. Specifically, unconnected devices may use idle time of connected devices (time that the shared HW resource is free) in order to perform background activities.

The problem with this is that the background activity and the HW resource availability time are asynchronous and therefore some of the time the background activity will not be performed due to missing resources. Moreover, it may happen that both the background activity and the resource availability are periodic and if their period is matched with opposite phase than the background activity will never be performed; although there is plenty of resource availability time to do it. An example of this situation, but not limited in this respect, is a WiFi periodic background scan that can be performed while WiMAX is in idle and frees the shared RF. In this case the idle is periodic and identical to the scan period—WiFi will never scan and will not be able to notify the user about the presence of WiFi in the area.

An embodiment of the present invention provides the creation of pseudo synchronization between the resource availability and the needed activity. When a shared HW resource becomes available, a notification will be generated (by the owner of the resource or by the resource itself based on the implementation). The comm device that needs the resource which is not available for it will register on this notification and will receive it when generated (registration/mask notification may be implementation based). Upon receiving the notification, the requesting device will wake up and perform the pending action. When HW resource is no longer needed, it will deregister from this notification.

The mechanism to perform notifications and registrations may be project/implementation based and if there are only two owners of a resource than one may always send the notification to the other and the other may mask it if it is not needed.

If there are more than two owners and there is a centralized HW resource manager, than it may generate the notification when the HW becomes free and it can also manage a list of all devices that it needs and send the notification only to one of them each time according to a prioritized algorithm (first asked, most important, round robin or any combination)—it is understood that this is not a requirement of the present invention.

Figure 2:
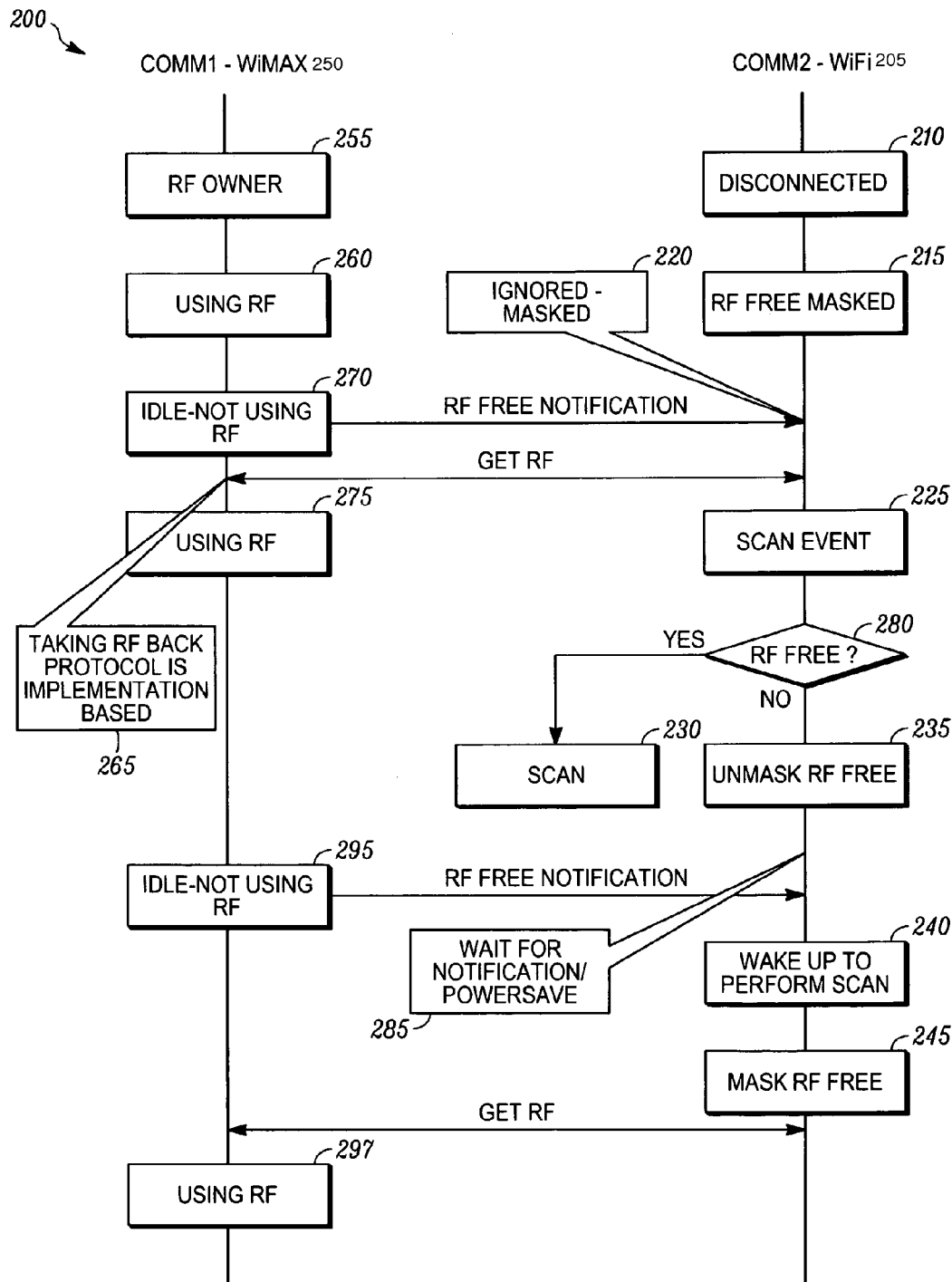
FIG. 2 shows an example of implementation in Echo peak with the shared HW being an RF resource of an embodiment of the present invention.

Turning now to FIG. 2 at 200 is example of implementation in Echo peak with the shared HW being an RF resource. Comm 1 (WiMAX) is shown at 250 and Comm 2 (WiFi) at 205. Echo Peak shares the RF between the WiFi and WiMax. It may support WiFi scan (or any other background activity) while WiMax is idle. WiFi background activities may be triggered periodically or from an application level and may be executed in case the RF is free (WiMax is idle) when activity was generated. If RF is not free, the activity will not be executed until next time an event for such activity will be generated and even then the RF may not be free.

The solution in Echo peak to support RF available triggered background action may include the following:

1. The WiMAX shall generate attention request on transition to "WiMAX idle" state (and release RF). WiFi shall be able to mask this trigger (i.e. to decide whether to wake up on this type of attention request or not).

2. If WiFi periodic scan fails, and last-scan's time is older than threshold (threshold is configurable), WiFi shall register to wake up on the attention request generated by WiMAX Idle transition.

3. When such trigger arrives, WiFi shall perform scan. If scan is successful, WiFi may mask the WiMAX Idle-attention request trigger. (else wake up on next transition to WiMAX Idle state).

4. Handling the periodic scan routine is up to WiFi: one option, although the present invention is not limited in this respect, is to leave it as is. Another option is to disable the procedure until a successful scan is performed.

In the embodiment shown in FIG. 2, Comm 1, WiMAX 250 is the RF owner 255, using the hardware resource RF 260. At 270 the idle state is shown as Comm 1 250 is not using RF and therefore Comm 1 250 sends message of RF free notification to Comm 2 WiFi 205. 260 depicts taking RF back protocol is implementation based in an embodiment of the present invention. 275 shows Comm 1250 using RF and returning to idle is accomplished at 295 and again an RF free notification is sent to Comm 2 205; Comm 1 205 once again returns to using RF at 297 with messaging of getting RF immediately prior.

Looking now at Comm 2—WiFi 205 RF is disconnected 210 and RF free masked at 215. RF free notification is received and ignored—Masked at 220. Get RF is exchanged and a scan event occurs at 225. If FR is free at 280, a scan occurs at 230. If no at 280 unMask RF free at 235. After RF free notification, wake up to perform scan is shown at 240 and mask RF free at 245.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

We claim:

1. An apparatus, comprising:
a network adapter configured for wireless communication using a plurality of wireless technologies that share at least one of a plurality of shared hardware (HW) components,
wherein said network adapter, in operation, shares at least one of the plurality of shared HW components by generating a notification indicating that a shared HW resource has become available to a requesting device that needs said HW resource; configuring said requesting device to an unmask state such that said requesting device receives said generated notification, and upon receiving said notification in the unmask state, wakes up and performs a pending action; and configuring said requesting device to a mask state in which said requesting device ignores said generated notification.

2. The apparatus of claim 1, wherein when said HW resource is no longer needed, or when the pending action is completed, or both, said requesting device is configured to the mask state.

3. The apparatus of claim 1, wherein said notification is generated by an owner of said HW resource or by said HW resource itself based on an implementation.

4. The apparatus of claim 3, wherein, if there are only two owners of said HW resource, than one of the two owners always sends said notification to the other.

5. The apparatus of claim 1, further comprising a HW resource manager and wherein, if there are more than two owners of said HW resource, than said notification is generated by said HW resource manager when said HW resource becomes free.

6. The apparatus of claim 5, where said HW resource manager manages a list of all devices that need said HW resource, and sends said notification only to one device at a time according to a predetermined algorithm.

7. The apparatus of claim 6, wherein said predetermined algorithm is implemented based on one or more techniques including first asked, most important, round robin, and any combination thereof.

8. A method, comprising:
configuring a network adapter for wireless communication using a plurality of wireless technologies that share at least one of a plurality of shared hardware (HW) components; and
configuring said network adapter to share at least one of the plurality of HW components by generating a notification indicating that a shared HW resource has become available to a requesting device that needs said HW resource, configuring said requesting device to an unmask state, such that said requesting device receives said generated notification, and upon receiving said notification in the unmask state, wakes up and performs a pending action, and configuring said requesting device to a mask state in which said requesting device ignores said generated notification.

9. The method of claim 8, further comprising configuring said requesting device to the mask state, when said HW resource is no longer needed, or when the pending action is completed, or both.

10. The method of claim 9, further comprising generating said notification by an owner of said HW resource or by said HW resource itself based on an implementation.

11. The method of claim 10, wherein, if there are only two owners of said HW resource, than one of the two owners always sends said notification to the other.

12. The method of claim 8, further comprising using a HW resource manager, that if there are more than two owners of said HW resource, is configured to generate said notification, when said HW resource becomes free.

13. The method of claim 12, further comprising managing, by said HW resource manager, a list of all devices that need said HW resource, and sending said notification only to one device at a time according to a predetermined algorithm.

14. The method of claim 13, wherein said predetermined algorithm is implemented based on one or more techniques including first asked, most important, round robin, and any combination thereof.

15. An article comprising a non-transitory storage medium having stored thereon instructions, that, when executed by a computing platform, result in:
configuring a network adapter for wireless communication using a plurality of wireless technologies that share at least one of a plurality of shared hardware (HW) components; and
configuring said network adapter to share at least one of the plurality of HW components by generating a notification indicating that a shared HW resource has become available to a requesting device that needs said HW resource, configuring said requesting device to an unmask state, such that said requesting device receives said generated notification, and upon receiving said notification in the unmask state, wakes up and performs a pending action, and configuring said requesting device to a mask state in which said requesting device ignores said generated notification.

16. The article of claim 15, comprising further instructions that when executed further result in configuring said requesting device to the mask state, when said HW resource is no longer needed, or the pending action is completed, or both.

17. The article of claim 16, comprising further instructions that when executed further result in generating said notification by an owner of said HW resource or by said HW resource itself based on an implementation.

18. The article of claim 17, wherein, if there are only two owners of said HW resource, than one of the two owners always sends said notification to the other.

19. The article of claim 15, comprising further instructions that when executed further result in using a HW resource manager, that if there are more than two owners of said HW resource, is configured to generate said notification, when said HW resource becomes free.

20. The article of claim 19, comprising further instructions that when executed further result in managing, by said HW resource manager, a list of all devices that need said HW resource, and sending said notification only to one device at a time according to a predetermined algorithm.

21. An apparatus, comprising:
a network adapter configured for wireless communication using a plurality of wireless technologies that share at least one of a plurality of shared hardware (HW) components,
wherein said network adapter is configured to share at least one of the plurality of HW components by:
generating a notification indicating that a shared HW resource has become available to a requesting device that needs said HW resource,
based on a result of a network scan performed by said requesting device or a determination that time elapsed since the network scan is greater than a threshold, or both, configuring said requesting device to an unmask state, such that said requesting device receives said generated notification, and upon receiving said notification in the unmask state, wakes up and performs a pending action, and
configuring said requesting device to a mask state in which said requesting device ignores said generated notification.

22. A method, comprising:
configuring a network adapter for wireless communication using a plurality of wireless technologies that share at least one of a plurality of shared hardware (HW) components; and
configuring said network adapter to share at least one of the plurality of HW components by:
generating a notification indicating that a shared HW resource has become available to a requesting device that needs said HW resource,
based on a result of a network scan performed by said requesting device or a determination that time elapsed since the network scan is greater than a threshold, or both, configuring said requesting device to an unmask state, such that said requesting device receives said generated notification, and upon receiving said notification in the unmask state, wakes up and performs a pending action, and
configuring said requesting device to a mask state in which said requesting device ignores said generated notification.

23. An article comprising a non-transitory storage medium having stored thereon instructions, that, when executed by a computing platform, result in:
configuring a network adapter for wireless communication using a plurality of wireless technologies that share at least one of a plurality of shared hardware (HW) components; and
configuring said network adapter to share at least one of the plurality of HW components by:

generating a notification indicating that a shared HW resource has becomes available to a requesting device that needs said HW resource, based on a result of a network scan performed by said requesting device or a determination that time elapsed since the network scan is greater than a threshold, or both, configuring said requesting device to an unmask state, such that said requesting device receives said generated notification, and upon receiving said notification in the unmask state, wakes up and performs a pending action, and configuring said requesting device to a mask state in which said requesting device ignores said generated notification.

* * * * *